Patented May 1, 1928.

1,667,848

UNITED STATES PATENT OFFICE

SEBASTIAN GASSNER, OF LEVERKUSEN, NEAR COLOGNE, GERMANY, ASSIGNOR TO GRASSELLI DYESTUFF CORPORATION, OF NEW YORK, N. Y., A CORPORATION OF DELAWARE.

YELLOW VAT DYESTUFF.

No Drawing.    Application filed February 16, 1925.    Serial No. 9,707.

I have invented new and useful improvements in yellow vat dyes of which the following is a specification.

My invention relates to the production of new anthraquinone derivatives which dye cotton from an alkaline hydrosulfite vat bright yellow to yellowish orange shades.

The process for producing these new dyestuffs consists in treating with concentrated sulfuric acid such anthraquinone anthrimids having an acidyl-amine substituent such as acetyl-, benzoyl-, salicyl-amine in each of the nuclei opposite to the nuclei linked together by the imino group. Examples of such substituted anthrimids are, for instance, 5-5'-dibenzoyl-amino-1-1'-dianthrimid

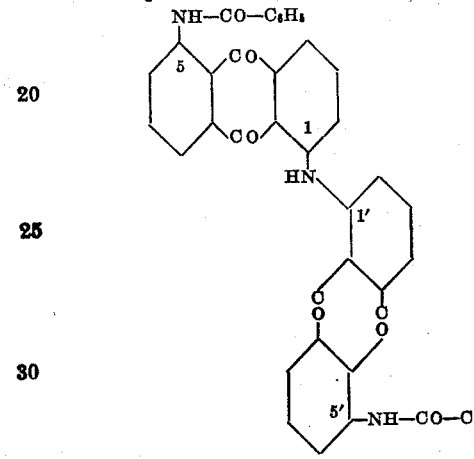

or 5-5'-dibenzoyl-amino-1-2'-anthrimid

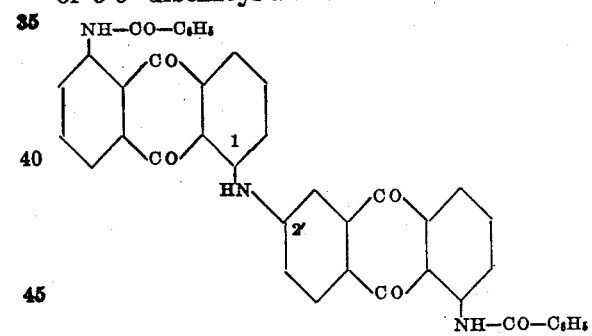

or 5-8'-dibenzoyl-amino-1-2'-anthrimid

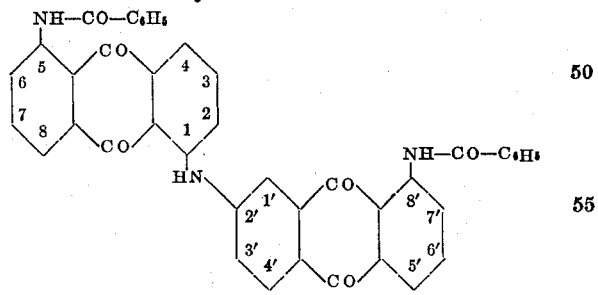

As a matter of convenience, I will call this type of substitution visavis substitution, to denote that the acidyl-amino substituent is attached to the benzene-anthraquinone nucleus opposite to the one to which the anthrimid-imino group is attached and in order to distinguish this type of compounds from anthrimids in which the substituents are attached to the same benzene-anthraquinone nucleus to which the anthrimid-imino group is attached, as, for instance, in 4-4'-dibenzoylamino-1-1'-dianthrimid

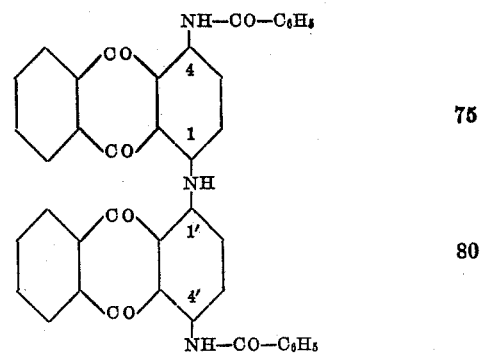

The action of sulfuric acid upon these anthrimids is not perfectly understood. The conditions of this action as, for instance, time, concentration, temperature, etc. can be varied within relatively wide limits. Chemically it can be assumed that an oxidation takes place by which a carbazol nucleus is formed, the end product in the case of the 5-5'-dibenzoyl-amino-1-1'-dianthrimid having most probably a formula of the type

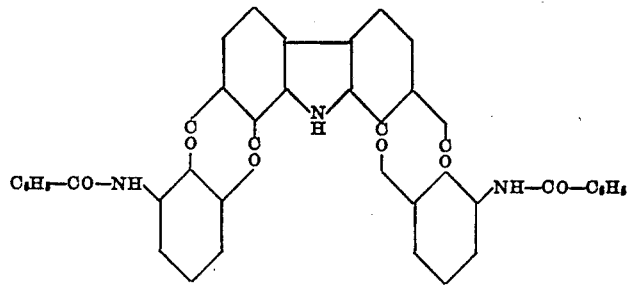

or in the case of the 5-5'-dibenzoylamino-1-2'-di-anthrimid:

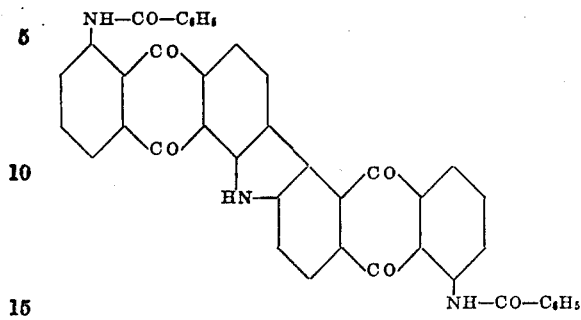

Anthrimids can be formed by the interaction of a halogen anthraquinone with an amino anthraquinone. When both substituents are in alpha position di-alpha anthrimids are obtained. From alpha halogen and beta-amino or from alpha amino and beta halogen-anthraquinones alpha-beta-anthrimids are produced. The vat dyestuffs obtained according to the above from both types of anthrimids are quite similar in their dyeing properties. The technical value of our new products resides in the fact that they are soluble in alkaline hydrosulfite solutions from which cotton is dyed in shades which, by oxidation, turn to very bright yellow or orange yellow shades, especially fast to light, washing, etc.

Compared with the similar products obtained by the action of sulfuric acid upon anthrimids in which the acidylamino group is attached to the same benzene-anthraquinone nucleus to which the anthrimid-imino group is attached, the shades of our products are entirely different. Instead of being brown or greenish olive, that is dark and dull colors, the shades obtained with my products are remarkable for their brilliancy.

In order to further illustrate my invention, the following examples are given, the parts being by weight:

*Example 1.*—One part 5-5'-dibenzoyl-amino-1-1'-dianthrimid is suspended in 10 parts 66° Bé. sulfuric acid and stirred at 30 to 35° C. until the mass assumes an olive coloration. 10 parts of 40% oleum are then added and the mixture poured on ice. The dyestuff separates in the shape of yellow flakes. It is filtered off, washed with water and dried. It is an orange powder, soluble in concentrated sulfuric acid with a blue color, difficultly soluble in boiling quinoline with a yellow color. It forms, with alkaline hydrosulfite solutions, a reddish-yellow vat from which cotton is dyed fast, bright orange-yellow shades.

*Example 2.*—One part 5-5'-dibenzoylamino-1-2'-dianthrimid is suspended in 10 parts concentrated sulfuric acid and stirred at a slightly elevated temperature. After the reaction mass has taken on an olive coloration, 40% oleum is added and the product poured on ice. The dyestuff separates in the shape of yellow flakes. It is filtered off, washed with water and dried. It is a yellow powder, soluble in concentrated sulfuric acid with a blue color, difficultly soluble in organic solvents with a yellow color, with alkaline hydrosulfite it forms a reddish-yellow vat from which cotton is dyed fast, bright yellowish orange shades.

I claim:—

1. The process of producing yellow vat dyes which comprises treating with concentrated sulfuric acid visavis substituted acidyl-amino-di-anthrimids at a temperature not greater than about 35° C.

2. The process of producing yellow vat dyes which comprises treating with concentrated sulfuric acid visavis substituted benzoylamino-di-anthrimids at a temperature not greater than about 35° C.

3. The process of producing yellow vat dyes which comprises treating with concentrated sulfuric acid visavis substituted acidyl-amino-di-alpha-anthrimids at a temperature not greater than about 35° C.

4. The process of producing yellow vat dyes which comprises treating with concentrated sulfuric acid visavis substituted benzoylamino-di-alpha-anthrimids at a temperature not greater than about 35° C.

5. The process of producing a yellow vat dye which comprises treating with concentrated sulfuric acid 5-5'-dibenzoylamino-1-1'-di-anthrimid at a temperature not greater than about 35° C.

6. The process of producing a yellow vat dye which consists in treating 5.5'-dibenzoylamino-1,1'-di-anthrimid with concentrated sulfuric acid at 30 to 35° C. and then adding oleum to the reaction mass.

7. As new products, the heteronuclear-substituted acidyl-amino-di-anthrimidcarbazole vat dyestuffs which dyestuffs are yellow powders soluble in concentrated sulfuric acid with blue colors, difficultly soluble in organic solvents, giving with alkaline hydrosulfite solutions reddish yellow vats from which cotton is dyed bright yellow to yellowish-orange shades, fast to light and washing.

8. As new products, the heteronuclear-substituted benzoyl-amino-di-anthrimidcarbazole vat dyestuffs which dyestuffs are yellow powders soluble in concentrated sulfuric acid with blue colors giving with alkaline hydrosulfite solutions reddish yellow vats from which cotton is dyed yellow to yellowish-orange shades, fast to light and washing.

9. As a new product, the vat dyestuff having most probably the formula

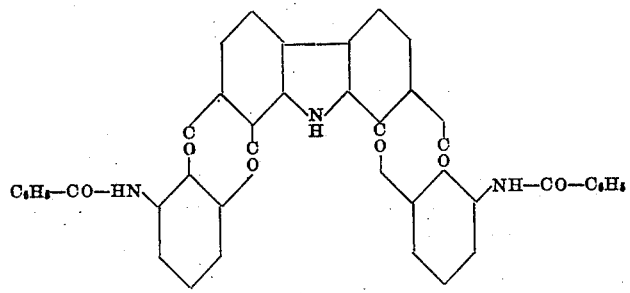

which dyestuff is a yellow powder, soluble in concentrated sulfuric acid with a blue color, difficultly soluble in boiling quinoline with a yellow color and dyeing cotton from an alkaline hydrosulfite vat, bright yellowish-orange shades, fast to light and washing.

In testimony whereof I have hereunto set my hand.

SEBASTIAN GASSNER.